US012775754B2

(12) United States Patent
Okabe et al.

(10) Patent No.: US 12,775,754 B2
(45) Date of Patent: Oct. 27, 2026

(54) POWER STORAGE DEVICE SIMULATION OF ELECTRICAL SHORTS AND THERMAL PHENOMENON AND METHOD OF USING THE SAME

(71) Applicant: GS Yuasa International Ltd., Kyoto (JP)

(72) Inventors: Yosuke Okabe, Kyoto (JP); Shigeki Yamate, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 1244 days.

(21) Appl. No.: 17/440,113

(22) PCT Filed: Jan. 29, 2020

(86) PCT No.: PCT/JP2020/003127
§ 371 (c)(1),
(2) Date: Sep. 16, 2021

(87) PCT Pub. No.: WO2020/189034
PCT Pub. Date: Sep. 24, 2020

(65) Prior Publication Data

US 2022/0188478 A1 Jun. 16, 2022

(30) Foreign Application Priority Data

Mar. 19, 2019 (JP) ................................ 2019-051226
Dec. 23, 2019 (JP) ................................ 2019-232048

(51) Int. Cl.
*G06F 30/13* (2020.01)
*G06F 30/20* (2020.01)
(Continued)

(52) U.S. Cl.
CPC ............ *G06F 30/20* (2020.01); *H01M 10/48* (2013.01); *G06F 2119/08* (2020.01)

(58) Field of Classification Search
CPC ........ G06F 30/00; G06F 30/13; G06F 40/221; G06F 40/143; G06F 30/12; G06F 16/2228; G06F 16/29; G06Q 50/06; G06Q 50/10
(Continued)

(56) References Cited

U.S. PATENT DOCUMENTS 5,428,560 A 6/1995 Leon et al.
6,542,784 B1 4/2003 Amaya et al.
(Continued)

FOREIGN PATENT DOCUMENTS

JP H11-014507 A 1/1999
JP 2001-152397 A 6/2001
(Continued)

OTHER PUBLICATIONS

Chiu, Kuan-Cheng et al., "An Electrochemical Modeling of Lithium-Ion Battery Nail Penetration", Dec. 1, 2013, Journal of Power Sources 251, Elsevier B.V. (Year: 2013).*
(Continued)

*Primary Examiner* — Cedric Johnson
(74) *Attorney, Agent, or Firm* — Buchalter LLP

(57) ABSTRACT

This simulation method includes accepting a simulation condition relating to an electricity storage device; and calculating a short circuit current on the basis of the accepted simulation condition to simulate a thermal phenomenon from the electricity storage device to the outside.

13 Claims, 11 Drawing Sheets

(51) Int. Cl.
*H01M 10/48* (2006.01)
*G06F 119/08* (2020.01)

(58) Field of Classification Search
USPC .................................................... 703/18, 13
See application file for complete search history.

(56) References Cited

U.S. PATENT DOCUMENTS

| | | | | |
|---|---|---|---|---|
| 2006/0155760 | A1 | 7/2006 | Takahashi et al. | |
| 2012/0182021 | A1 * | 7/2012 | McCoy .............. | G01R 31/3832 324/433 |
| 2016/0290943 | A1 | 10/2016 | Sakashita et al. | |
| 2017/0084969 | A1 | 3/2017 | Choi | |
| 2020/0210541 | A1 | 7/2020 | Han | |

FOREIGN PATENT DOCUMENTS

| | | | | | |
|---|---|---|---|---|---|
| JP | 2001-179336 | A | | 7/2001 | |
| JP | 2004-220600 | A | | 8/2004 | |
| JP | 2006010648 | A | * | 1/2006 | |
| JP | 2009-106059 | A | | 5/2009 | |
| JP | 2010/015890 | A | | 1/2010 | |
| JP | 2010-272239 | A | | 12/2010 | |
| JP | 2012-069496 | A | | 4/2012 | |
| JP | 2012-154665 | A | | 8/2012 | |
| JP | 2012-174570 | A | | 9/2012 | |
| JP | 2013-089549 | A | | 5/2013 | |
| JP | 2013-101884 | A | | 5/2013 | |
| JP | 2015-050062 | A | | 3/2015 | |
| JP | 2016-090399 | A | | 5/2016 | |
| JP | 2016-194919 | A | | 11/2016 | |
| JP | 2017-059343 | A | | 3/2017 | |
| JP | 2017-139857 | A | | 8/2017 | |
| WO | WO-2018132911 | A1 | * | 7/2018 | ........... G01R 31/385 |

OTHER PUBLICATIONS

Zavalis, Tommy Georgios et al., "Investigation of Short-Circuit Scenarios in a Lithium-Ion Battery Cell", Apr. 16, 2021, Journal of the Electrochemical Society, 159(6). (Year: 2012).*
Lee, Seung-Mi et al., "Failure Analysis of Short-Circuited Lithium-Ion Battery with Nickel-Manganese-Cobalt/Graphite Electrode", 2018, Journal of Nanoscience and Nanotechnology, vol. 18, American Scientific Publishers. (Year: 2018).*
Haimovich, Nir et al., "A Simulator for System-Level Analysis of Heat Transfer and Phase Change in Thermal Batteries", Apr. 10, 2009, Journal of the Electrochemical Society, 156(6). (Year: 2009).*
Rashid, Muhammad et al., "Mathematical Model for Combined Effect of SEI Formation and Gas Evolution in Li-Batteries", Aug. 6, 2014, ECS Electrochemistry Letters, 3(10), The Electrochemical Society. (Year: 2014).*
International Searching Authority, International Search Report and Written Opinion for International Application No. PCT/JP2020/003127, dated Mar. 3, 2020, (12 pages), Japan Patent Office, Tokyo, Japan.
Ning, Gang et al. *Cycle Life Modeling of Lithium-Ion Batteries*, Journal of the Electrochemical Society, vol. 151, No. 10, pp. A1584-A1591, Sep. 21, 2004.
Chiu, Kuan-Cheng et al. "An Electrochemical Modeling of Lithium-ion Battery Nail Penetration," *Journal of Power Sources*, vol. 251, Dec. 1, 2013, pp. 254-263, XP028807492. ISSN: 0378-7753, DOI: 10.1016/j.jpowsour.2013.11.069.
Dai, Haifeng et al. "Adaptive Kalman Filtering Based Internal Temperature Estimation With an Equivalent Electrical Network Thermal Model for Hard-Cased Batteries," *Journal of Power Sources*, vol. 293, Oct. 20, 2015, pp. 351-365, DOI: 10.1016/j.jpowsour.2015.05.087.
Extended European Search Report for European Patent Application No. 20772540.9, dated Apr. 7, 2022, (8 pages), European Patent Office, Munich, Germany.
Extended European Search Report for European Patent Application No. 20773733.9, dated May 2, 2022, (15 pages), European Patent Office, Munich, Germany.
Guo, Meng et al. "Single-Particle Model for a Lithium-Ion Cell: Thermal Behavior," *Journal of the Electrochemical Society*, vol. 158, No. 2, pp. A122-A132, Dec. 15, 2010, DOI: 10.1149/1.3521314.
International Searching Authority, International Search Report and Written Opinion for International Application No. PCT/JP2020/012068, dated Jun. 16, 2020, (13 pages), Japan Patent Office, Tokyo, Japan.
Kelley, Douglas H. "Fluid Mechanics of Liquid Metal Batteries," arXiv Preprint arXiv: 1710.03150v1 [physics.flu-dyn] Oct. 9, 2017, (31 pages), XP080827265, available online <URL: https://arxiv.org/abs/1710.03150>.
Kim, Ui Seong et al. "Modeling the Dependence of the Discharge Behavior of a Lithium-Ion Battery on the Environmental Temperature," *Journal of The Electrochemical Society*, vol. 158, No. 5, pp. A611-A618, Mar. 28, 2011, DOI: 10.1149/1.3565179.
Lin, Xinfan et al. "A Lumped-Parameter Electro-Thermal Model for Cylindrical Batteries," *Journal of Power Sources*, vol. 257, Jan. 31, 2014, pp. 1-11, XP028636585, ISSN: 0378-7753, DOI: 10.1016/j.jposour.2014.01.097.
Roberts, Christine C. et al. "Molten Salt Batteries: Mechanics and Electrolyte Transport 670g—Introduction to Thermal Batteries," *Aiche Annual Conference, Lithium and Beyond, Fundamental Advances in High Performance Batteries 1*, Sandia National Laboratories (SAND2017-11696C), Nov. 2, 2017, (21 pages), XP055905243, Albuquerque, New Mexico, US, available online <URL: https://www.osti.gov/servlets/purl/1480588>.
Roberts, Scott A. "Multiphysics Modeling of Thermal Batteries," *Sandia National Laboratories*, (24 pages), Dec. 7, 2016.
Shen, Yuxin et al. "Thermal Convection in a Liquid Metal Battery," *Theoretical and Computational Fluid Dynamics*, vol. 30, No. 4, pp. 275-294, (Dec. 11, 2015, XP036006355, ISSN: 0935-4964, DOI: 10.1007/S00162-015-0378-1.
Trembacki, Bradley L. et al. "Uncertainty Quantification Verification and Validation of a Thermal Simulation Tool for Molten Salt Batteries," *47th Power Sources Conference*, Sandia National Laboratories (SAND2016-5705C), Jun. 15, 2016, (14 pages), XP055905271, Albuquerque, New Mexico, US, available online <URL: https://www.osti.gov/servlets/purl/1368656>.
Voskuilen, Tyler G. et al. "Multi-Physics Multi-Plateau Reaction Model for LiSi/FeS2 Batteries," *Power Sources Conference*, Sandia National Laboratories (SAND2016-3229C), Apr. 1, 2016, XP055905364, (4 pages), available online <URL: https://www.osti.gov/servlets/purl/1581535>.
Zhao, Rui et al. "A Comprehensive Study on Li-ion Battery Nail Penetrations and the Possible Solutions," *Energy*, vol. 123, Feb. 4, 2017, pp. 392-401, XP029952540, ISSN: 0360-5442, DOI: 10.1016/j.energy.2017.02.017.
Fujiwara, et al., "New Molten Salt Systems for High-Temperature Molten Salt Batteries: LiF—LiCl—LiBr-based Quaternary Systems", *Journal of Power Sources*, pp. 7691-7700, May 25, 2010.
Haimovich, et al., "A Simulator for System-Level Analysis of Heat Transfer and Phase Change in Thermal Batteries" *Journal of the Electrochemical Society*, vol. 162, pp. A350-A362, Dec. 23, 2014.
Peirce, et al., "On a New Method of Comparing the Electromotive Forces of Two Batteries and Measuring Their Internal Resistance" *Proceedings of the American Academy of Arts and Sciences*, vol. 12, pp. 137-140, May 1876.
Non-Final Office Action for U.S. Appl. No. 17/440,579, dated Sep. 12, 2024, (18 pages).

* cited by examiner

| Battery ID | User ID | Positive electrode | | | | | Negative electrode | | | | | ••••• |
|---|---|---|---|---|---|---|---|---|---|---|---|---|
| | | Active material | Thickness | Width | Depth | OCP | Active material | Thickness | Width | Depth | OCP | ••••• |
| c001 | u001 | LMO | Zp | Xp | Yp |  | Graphite | Zn | Xn | Yn |  | ••••• |
| ⋮ | ⋮ | ⋮ | ⋮ | ⋮ | ⋮ | ⋮ | ⋮ | ⋮ | ⋮ | ⋮ | ⋮ | ••••• |

POWER STORAGE DEVICE SIMULATION OF ELECTRICAL SHORTS AND THERMAL PHENOMENON AND METHOD OF USING THE SAME

CROSS REFERENCE TO RELATED APPLICATIONS

This application is a national stage application, filed under 35 U.S.C. § 371, of International Application No. PCT/JP2020/003127, filed Jan. 29, 2020, which claims priority to Japan Application Nos. 2019-051226, filed Mar. 19, 2019, and 2019-232048, filed Dec. 23, 2019, the contents of all of which as are hereby incorporated by reference in their entireties.

BACKGROUND

Technical Field

The present invention relates to a computer-implemented simulation method, a simulation device, and a computer program.

Description of Related Art

In recent years, model-based development (MBD) has been actively introduced in various industries including the automobile industry, and product development based on simulation has permeated (see, for example, JP-A-11-14507).

BRIEF SUMMARY

In model-based development, for example, a case where thermal safety is simulated for a specific power storage device that is one of development elements. It is necessary to set various conditions according to a physical phenomenon or a chemical phenomenon occurring inside the power storage device. In an event related to safety of the power storage device, a plurality of physical phenomena such as chemical reaction, heat transfer, current, electrochemistry, and fluid dynamics are related to each other, and a mechanism and a physical property value are often unknown. For this reason, it is difficult for a technician who is not familiar with batteries to simulate the safety of the power storage device. However, in consideration of the recent remarkable development progress of electric vehicles, renewable energy, smart grids, and the like, there is high expectation for a high-performance and highly safe power storage device, and safety design using simulation is significant.

The present invention has been made in view of such circumstances, and an object of the present invention is to provide a simulation method, a simulation device, and a computer program that enable even a technician who is not familiar with batteries to easily simulate a thermal phenomenon of a power storage device.

A simulation method receives a simulation condition related to a power storage device, and calculates short-circuit current based on the received simulation condition to simulate a thermal phenomenon from the power storage device to the outside.

A simulation device includes a reception unit that receives a simulation condition related to a power storage device, a simulation execution unit that calculates short-circuit current based on the received simulation condition to simulate a thermal phenomenon from the power storage device to outside, and an output unit that outputs a simulation result by the simulation execution unit or a simulation program based on the simulation condition.

A computer program is a computer program for causing a computer to execute processing of presenting a user interface that receives a simulation condition related to a power storage device, and calculating short-circuit current based on the received simulation condition to simulate a thermal phenomenon from the power storage device to the outside.

According to the above configuration, even a technician who is not familiar with batteries can easily simulate a thermal phenomenon of a power storage device.

DETAILED DESCRIPTION OF VARIOUS EMBODIMENTS

Figure 1:
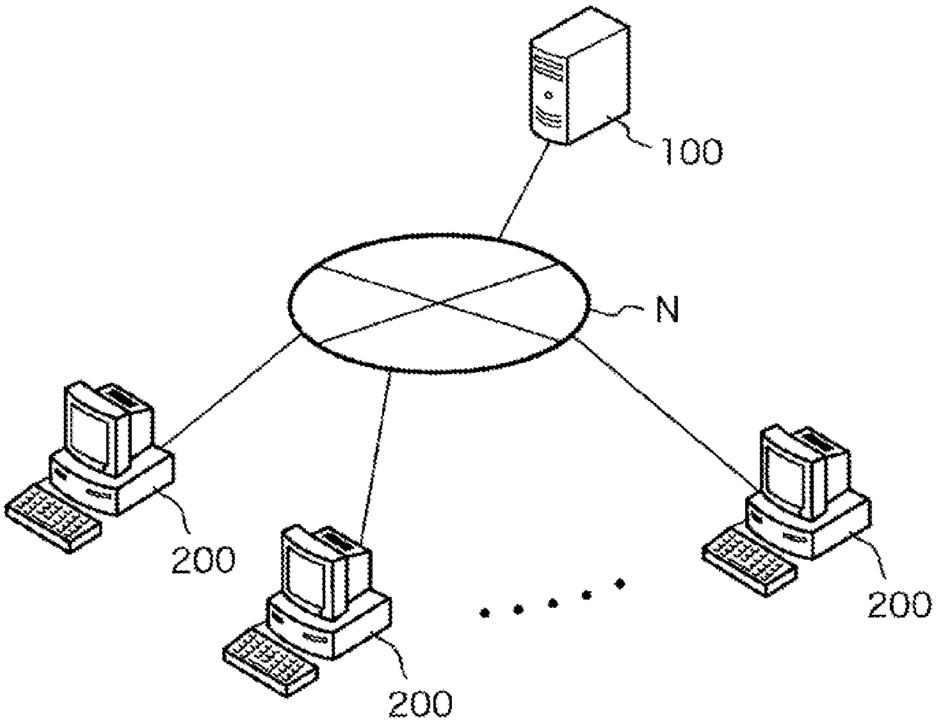
FIG. 1 is a schematic diagram describing an overall configuration of a simulation system according to an embodiment.

A simulation method receives a simulation condition related to a power storage device, and calculates short-circuit current based on the received simulation condition to simulate a thermal phenomenon from the power storage device to the outside. The outside may be, for example, a container that houses a power storage device or a power storage system including a plurality of power storage devices, a storage battery storage unit of a vehicle, or a space outside a building that houses a power storage device.

According to this configuration, a thermal phenomenon from the power storage device to the outside can be simulated based on the received simulation condition. The thermal phenomenon from the power storage device to the outside includes, for example, an exothermic phenomenon due to Joule heating and a material decomposition reaction accompanying an internal short-circuit and an external short-circuit, an exothermic phenomenon due to a material decomposition reaction in a case where the power storage device is heated from the outside, and gas generation accompanying heat generation of the power storage device. In the present simulation method, a heat generation rate of the power storage device, a gas generation rate, and the like are calculated based on a simulation condition.

The simulation method may receive a simulation condition transmitted from an external terminal after user authentication using the external terminal, and transmit an execution result of simulation based on the received simulation condition to the external terminal. According to this configuration, even in a case where the user is not familiar with a theory representing behavior of the power storage device, a simulation result or a simulation program of a thermal phenomenon appearing outside the power storage device can be provided to the user only by receiving of a simulation condition.

The simulation condition may include an occurrence location of an internal short-circuit in the power storage device, and the simulation method may simulate the thermal phenomenon accompanying the internal short-circuit. The simulation condition may further include information related to a resistance value of a short circuit portion. The information related to the resistance value of the short circuit portion may include a name (for example, nickel and iron) and a shape (for example, a circle, a square, and their sizes) of a substance that causes an internal short-circuit, a mode of the internal short-circuit (for example, crash, nail penetration, foreign object contamination), and the like, and it is preferable that the resistance value of the short circuit portion be able to be calculated from the information. Instead of the above-described indirect information, the information related to the resistance value of the short circuit portion may directly indicate a resistance value of a short circuit portion, such as contact resistance between the short circuit portion and a member constituting the power storage device (for example, positive electrode current collecting foil). According to this configuration, it is possible to simulate a thermal phenomenon accompanying an internal short-circuit at different occurrence locations by providing an occurrence location of the internal short-circuit.

The power storage device may include a wound electrode assembly, and the simulation method may calculate short-circuit current in a state where the wound electrode assembly is virtually developed. According to this configuration, since short-circuit current is calculated in consideration of a structure of a wound cell, a thermal phenomenon according to a through short circuit or a partial short circuit can be accurately simulated.

The simulation condition may include information related to a resistance value in an external short-circuit of the power storage device, and the simulation method may simulate the thermal phenomenon accompanying the external short-circuit. According to this configuration, a thermal phenomenon accompanying an external short-circuit can be simulated by providing information related to a resistance value in the external short-circuit.

A simulation method according to another embodiment receives a simulation condition related to a power storage device, the simulation condition including a heating location when the power storage device is heated from the outside, and simulates a thermal phenomenon from the power storage device to the outside accompanying heating of the power storage device based on the received simulation condition. The simulation condition may further include an amount of heat of external heating. The simulation condition may further include an environmental temperature. According to this configuration, it is possible to simulate a thermal phenomenon accompanying heating by providing a heating location when the power storage device is heated from the outside.

The simulation method may simulate the thermal phenomenon by coupled analysis of an electrochemical reaction in the power storage device and an exothermic reaction in a material decomposition reaction of the power storage device. Since the exothermic reaction and Joule heating of the battery are not independent physical phenomena, and proceed while being correlated with each other through physical phenomena such as heat transfer, it is possible to simulate the behavior of the battery by accurately reflecting a phenomenon occurring inside the battery by performing coupled analysis.

The simulation method may formulate a relationship between a temperature and a calorific value obtained by differential thermal analysis of the power storage device, and calculates a heat generation rate in a material decomposition reaction of the power storage device based on a relational expression between a temperature and a calorific value obtained by formulation. According to this configuration, since the relationship between a temperature and a calorific value obtained by differential thermal analysis is formulated, it is not necessary to convert the relationship between a temperature and a calorific value into a relationship between time and a calorific value.

A simulation method according to another embodiment receives a simulation condition related to a power storage device, and simulates generation of gas accompanying a material decomposition reaction of the power storage device based on the received simulation condition. In a case where an event such as an internal short-circuit occurs in the power storage device and a safety mechanism does not function well, there is possibility that the material decomposition reaction progresses and gas at a high temperature is ejected from the inside of the power storage device. In the present simulation method, gas generation accompanying a material decomposition reaction can be simulated.

The simulation method may calculate at least one of a generation rate of the gas and a generation rate of an amount of heat based on a reaction rate of the material decomposition reaction. The generation rate of the gas may be calculated so as to be proportional to the reaction rate of the material decomposition reaction. According to this configuration, at least one of the generation rate of gas and the generation rate of an amount of heat is calculated based on the reaction rate of the material decomposition reaction.

A simulation device includes a reception unit that receives a simulation condition related to a power storage device, a simulation execution unit that calculates short-circuit current based on the received simulation condition to simulate a thermal phenomenon from the power storage device to outside, and an output unit that outputs a simulation result by the simulation execution unit or a simulation program based on the simulation condition.

According to this configuration, a thermal phenomenon from the power storage device to the outside can be simulated based on the received simulation condition. The thermal phenomenon from the power storage device to the outside includes, for example, an exothermic phenomenon due to a material decomposition reaction accompanying an internal short-circuit and an external short-circuit, an exothermic phenomenon due to a material decomposition reaction in a case where the power storage device is heated from the outside, and gas generation accompanying heat generation of the power storage device. In the present simulation device, a heat generation rate of the power storage device, a gas generation rate, and the like are calculated based on a simulation condition.

A computer program causes a computer to execute processing of presenting a user interface that receives a simulation condition related to a power storage device, and calculating short-circuit current based on the received simulation condition to simulate a thermal phenomenon from the power storage device to the outside.

According to this configuration, a thermal phenomenon from the power storage device to the outside can be simulated based on the received simulation condition. The thermal phenomenon from the power storage device to the outside includes, for example, an exothermic phenomenon due to a material decomposition reaction accompanying an internal short-circuit and an external short-circuit, an exothermic phenomenon due to a material decomposition reaction in a case where the power storage device is heated from the outside, and gas generation accompanying heat generation of the power storage device. In the present computer program, a heat generation rate of the power storage device, a gas generation rate, and the like are calculated based on a simulation condition.

Hereinafter, the present invention will be specifically described with reference to the drawings illustrating an embodiment of the present invention.

First Embodiment

FIG. 1 is a schematic diagram describing an overall configuration of a simulation system according to the present embodiment. The simulation system according to the present embodiment includes a server device 100 and a client device 200 communicably connected to each other via a communication network N. In response to a request from the client device 200, the server device 100 simulates a thermal phenomenon appearing in the outside from the power storage device and provides a simulation result to the client device 200. Here, the power storage device of a simulation target includes an energy storage device (cell) such as a lead-acid battery, a secondary battery such as a lithium ion battery, or a capacitor. Further, the power storage device of a simulation target may include a module in which a plurality of cells are connected in series, a bank (series connection battery group) in which a plurality of modules are connected in series, a domain (parallel connection battery group) in which a plurality of banks are connected in parallel, and the like.

The client device 200 is a terminal device such as a personal computer, a smartphone, or a tablet terminal used by the user. Software (application program) for accessing the server device 100 is installed in the client device 200. The server device 100 performs, for example, user authentication based on a user ID and a password when receiving an access from the client device 200, and provides an appropriate service to the client device 200 in a case where the user authentication is successful.

After the user authentication, the server device 100 according to the present embodiment transmits, to the client device 200, an interface screen for receiving various inputs by the user of the client device 200. The interface screen includes, for example, a reception screen for receiving a simulation condition. The server device 100 transmits a simulation result executed on the basis of the received condition to the client device 200.

The simulation result transmitted from the server device 100 to the client device 200 includes data such as numerical data and a graph obtained as an execution result of a simulation. The simulation result transmitted from the server device 100 to the client device 200 may include a mathematical model obtained as an execution result of simulation or a simulation program based on a simulation condition.

In the present embodiment, a simulation condition is received in the client device 200, and the received simulation condition and the like are transmitted to the server device 100 so that simulation is executed. Alternatively, the server device 100 may receive a simulation condition, execute simulation on the basis of the received simulation condition or the like, and display a simulation result on the server device 100.

Figure 2:
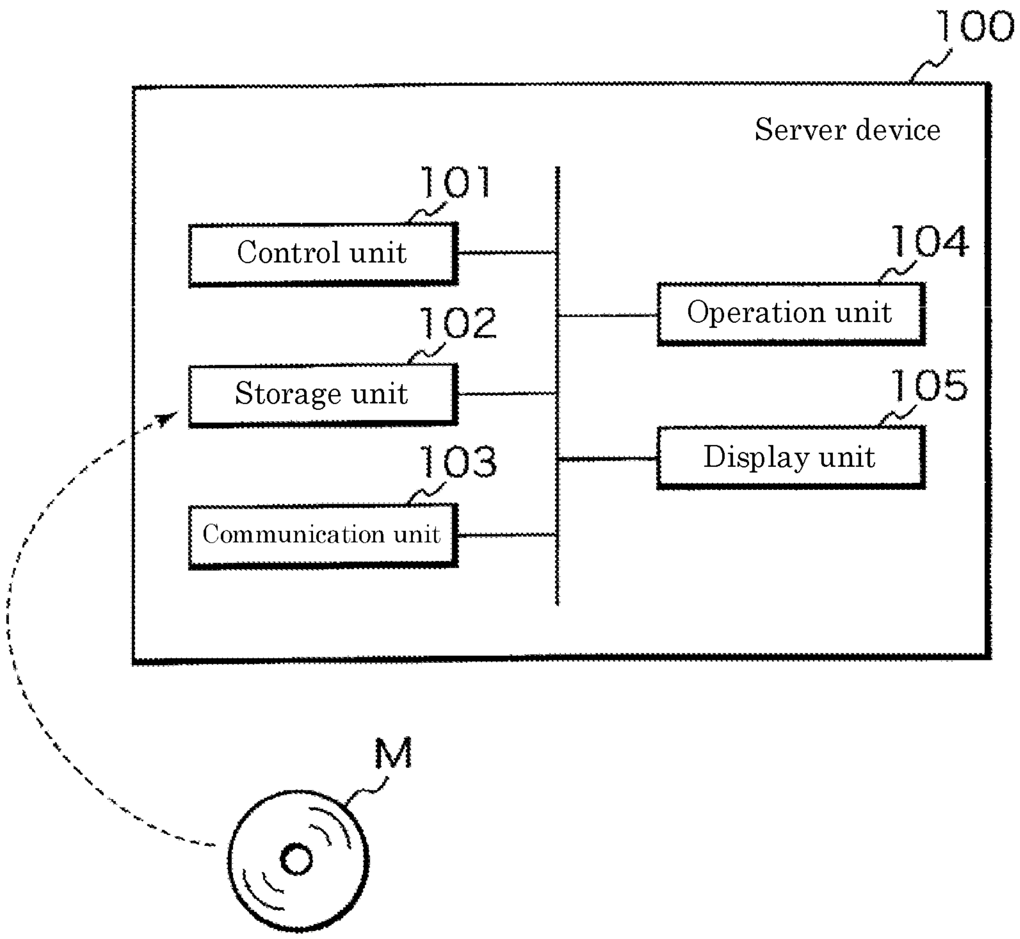
FIG. 2 is a block diagram describing an internal configuration of a server device.

FIG. 2 is a block diagram describing an internal configuration of the server device 100. The server device 100 includes a control unit 101, a storage unit 102, a communication unit 103, an operation unit 104, and a display unit 105.

The control unit 101 includes a central processing unit (CPU), a read only memory (ROM), a random access memory (RAM), and the like. The CPU included in the control unit 101 loads various computer programs stored in the ROM or the storage unit 102 into the RAM and executes the programs so as to cause the entire device to function as the simulation device of the present application by. The server device 100 is merely an embodiment of the simulation device, and may be any information processing device communicably connected to the client device 200.

The control unit 101 is not limited to the above configuration, and may be any processing circuit or arithmetic circuit including a plurality of CPUs, a multi-core CPU, a graphics processing unit (GPU), a microcomputer, a volatile or nonvolatile memory, and the like. The control unit 101 may have a function of a timer that measures elapsed time from when a measurement start instruction is given to when a measurement end instruction is given, a counter that counts the number, a clock that outputs date and time information, and the like.

The storage unit 102 includes a storage device using a hard disk drive (HDD), a solid state drive (SSD), or the like. The storage unit 102 stores various computer programs executed by the control unit 101, data necessary for executing the computer programs, and the like. The computer program stored in the storage unit 102 includes a simulation program for simulating a thermal phenomenon appearing in the outside from the power storage device. The simulation program is, for example, execution binary. A theoretical equation that is a source of the simulation program is described by an algebraic equation or a differential equation representing a thermal phenomenon appearing in the outside from the power storage device. The simulation program may be a single computer program or a program group including a plurality of computer programs. The simulation program may be described by commercially available numerical analysis software or programming language such as MATLAB (registered trademark), Amesim (registered trademark), Twin Builder (registered trademark), MATLAB & Simulink (registered trademark), Simplorer (registered trademark), ANSYS (registered trademark), Abaqus (registered trademark), Modelica (registered trademark), VHDL-AMS (registered trademark), C language, C++, or Java (registered trademark). The numerical analysis software may be a circuit simulator referred to as 1D-CAE, or simulation such as a finite element method or a finite volume method by a 3D shape. A reduced-order model (ROM) based on these may be used.

The program stored in the storage unit 102 may be provided by a non-transitory recording medium M in which the program is recorded in a readable manner. The recording medium M is, for example, a portable memory such as a CD-ROM, a universal serial bus (USB) memory, a secure digital (SD) card, a micro SD card, and a compact flash (registered trademark). In this case, the control unit 101 reads a program from the recording medium M using a reading device (not illustrated), and installs the read program in the storage unit 102. The program stored in the storage unit 102 may be provided by communication via the communication unit 103. In this case, the control unit 101 acquires the program through the communication unit 103 and installs the acquired program in the storage unit 102.

The storage unit 102 may store a mathematical model obtained as a result of simulation. The mathematical model is, for example, an execution code executed by a programming language or numerical analysis software. The mathematical model may be definition information or a library file referred to by a programming language or numerical analysis software.

Figure 3:
FIG. 3 is a conceptual diagram illustrating an example of a battery table.
Figure 3:

The storage unit 102 may have a battery table in which information on the power storage device (for example, a secondary battery) is stored in association with a user ID. FIG. 3 is a conceptual diagram illustrating an example of the battery table. The battery table stores, for example, a battery ID for identifying a battery, a user ID for identifying the user, and battery information in association with each other. The battery information registered in the battery table includes, for example, information on the positive electrode and the negative electrode, information on the electrolyte solution, information on the current collector, and the like. The information on the positive electrode and the negative electrode is information such as an active material name, thickness, width, depth, and open circuit potential of the positive electrode and the negative electrode. The information on the electrolyte solution and the current collector is information on ion species, transport number, diffusion coefficient, conductivity, and the like. The battery table may include a link that refers to information of physical property, an operating state, a circuit configuration, and the like of the power storage device. The information stored in the battery table may be registered by the administrator of the server device 100 or may be registered by the user via the client device 200. The information stored in the battery table may be used as a part of a simulation condition when a thermal phenomenon of the power storage device is simulated.

The communication unit 103 includes an interface for communicating with the client device 200 through the communication network N. In a case where information to be transmitted to the client device 200 is input from the control unit 101, the communication unit 103 transmits the input information to the client device 200 and outputs information from the client device 200 received through the communication network N to the control unit 101.

The operation unit 104 includes an input interface such as a keyboard and a mouse, and receives operation by the user. The display unit 105 includes a liquid crystal display device and the like, and displays information to be notified to the user. In the present embodiment, the server device 100 includes the operation unit 104 and the display unit 105. However, the operation unit 104 and the display unit 105 are not essential, and the configuration may be such that operation is received through a computer connected to the outside of the server device 100 and information to be notified is output to the external computer.

Figure 4:
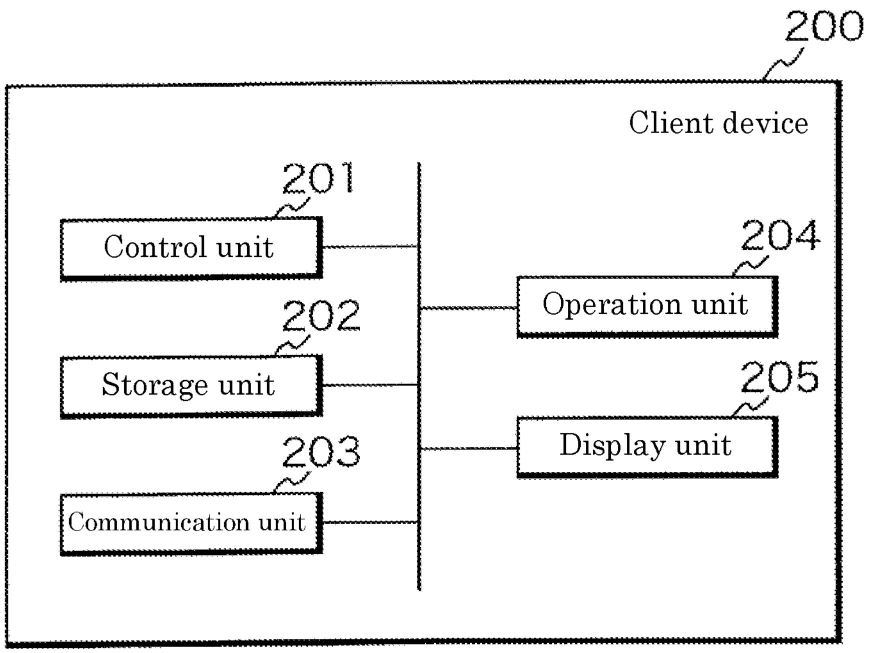
FIG. 4 is a block diagram describing an internal configuration of a client device.

FIG. 4 is a block diagram describing an internal configuration of the client device 200. The client device 200 is a personal computer, a smartphone, a tablet terminal, or the like, and includes a control unit 201, a storage unit 202, a communication unit 203, an operation unit 204, and a display unit 205.

The control unit 201 includes a CPU, a ROM, a RAM, and the like. The CPU included in the control unit 201 loads various computer programs stored in the ROM or the storage unit 202 into the RAM and executes control of the entire device.

The control unit 201 is not limited to the above configuration, and may be any processing circuit or arithmetic circuit including a plurality of CPUs, a multi-core CPU, a microcomputer, and the like. The control unit 201 may have a function of a timer that measures elapsed time from when a measurement start instruction is given to when a measurement end instruction is given, a counter that counts the number, a clock that outputs date and time information, and the like.

The storage unit 202 includes a nonvolatile memory such as an electronically erasable programmable read only memory (EEPROM), and stores various computer programs and data. The computer program stored in the storage unit 202 includes a general-purpose or dedicated application used for exchanging information with the server device 100. An example of the general-purpose application program is a web browser. In a case where a web browser is used to make an access to the server device 100, it is preferable to perform user authentication using a user ID and an authentication code, and communication between the server device 100 and the client device 200 is preferably permitted only in a case where the user authentication is successful.

The communication unit 203 includes an interface for communicating with the server device 100 through the communication network N. When information to be transmitted to the server device 100 is input from the control unit 201, the communication unit 203 transmits the input information to the server device 100 and outputs information from the server device 100 received through the communication network N to the control unit 201.

The operation unit 204 includes an input interface such as a keyboard, a mouse, and a touch panel, and receives operation by the user. The display unit 205 includes a liquid crystal display device and the like, and displays information to be notified to the user. In the present embodiment, the client device 200 includes the operation unit 204. However, the configuration may be such that an input interface such as a keyboard or a mouse is connected to the client device 200.

Hereinafter, a configuration for simulating a thermal phenomenon accompanying an internal short-circuit of the power storage device in the server device 100 will be described.

In a case of simulating a thermal phenomenon accompanying an internal short-circuit of the power storage device, the server device 100 receives information related to an occurrence location of the internal short-circuit and a resistance value of a short circuit portion as a simulation condition. At this time, the server device 100 may cause the display unit 205 of the client device 200 to display a reception screen for receiving a simulation condition, and may receive a simulation condition through the displayed reception screen.

Figure 5:
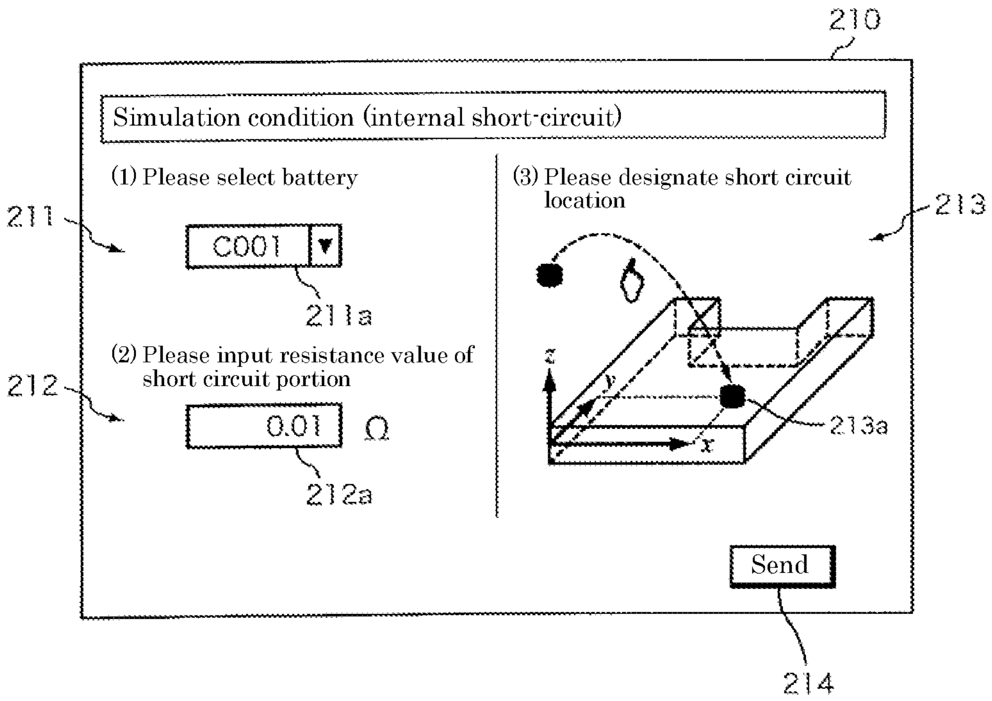
FIG. 5 is a schematic diagram illustrating an example of a reception screen for receiving a simulation condition.

FIG. 5 is a schematic diagram illustrating an example of the reception screen for receiving a simulation condition. A reception screen 210 illustrated in FIG. 5 includes a selection field 211 for selecting a battery of a simulation target, an input field 212 for inputting information related to a resistance value of a short circuit portion, and a designation field 213 for designating an occurrence location of an internal short-circuit. A pull-down menu 211*a* is arranged in the selection field 211, and a type of the battery of a simulation target is received by the pull-down menu 211*a*. An input box 212*a* is arranged in the input field 212, and an input of a resistance value is received as a numerical value is input using the operation unit 204, for example. In the designation field 213, a three-dimensional schematic diagram of the power storage device (cell) and an icon 213*a* indicating the occurrence location of the internal short-circuit are displayed for receiving the occurrence location of the internal short-circuit. Alternatively, a three-dimensional schematic diagram of a module, a bank, or a domain may be displayed, and a short circuit location may be received in the displayed schematic diagram. The reception screen 210 receives the occurrence location of the internal short-circuit by moving operation (drag operation) of the icon 213*a* using operation unit 204.

In a case where a send button 214 is operated on the reception screen 210, an input simulation condition (information about a battery, information about a resistance value of the short circuit portion, and the occurrence location of the internal short-circuit) is transmitted from the client device 200 to the server device 100. The server device 100 simulates the power storage device on the basis of the simulation condition transmitted from the client device 200.

Hereinafter, a simulation method of the power storage device will be described.

Figure 6:
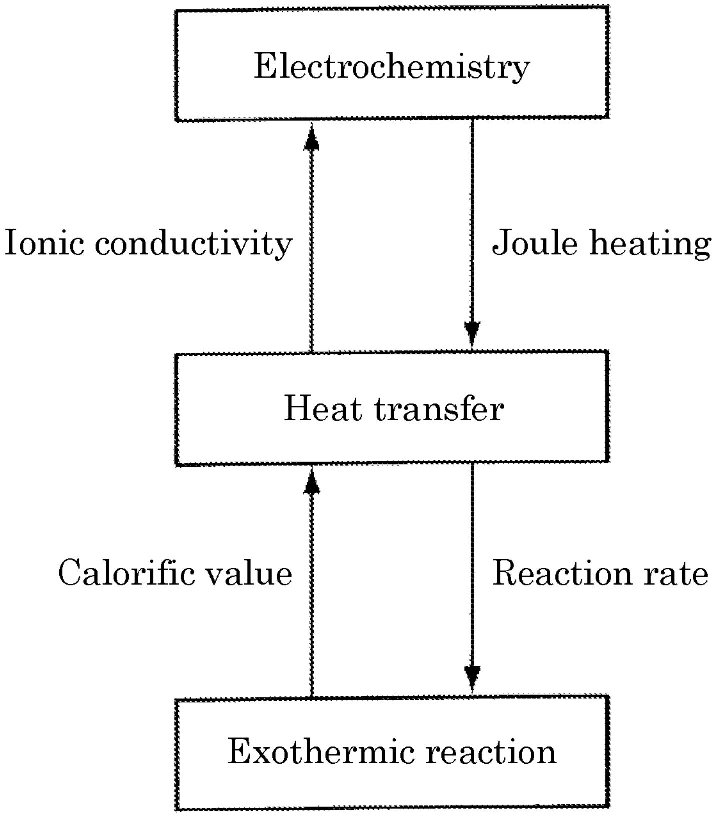
FIG. 6 is an explanatory diagram for describing an outline of a simulation method.

FIG. 6 is an explanatory diagram for describing an outline of the simulation method. The server device 100 according to the present embodiment simulates behavior of the power storage device based on Joule heating and an exothermic reaction caused by material decomposition. In addition to the above, the heat generation may include enthalpy reaction heat (reversible reaction heat) and electrochemical reaction heat (irreversible reaction heat) accompanying an electrochemical reaction.

The server device 100 can use, for example, the Newman model for an electrochemical reaction. The Newman model is an electrochemical model in which homogeneous, single-diameter spheres are assumed to be arranged close to each other in the positive electrode and the negative electrode. The Newman model is described by the Nernst-Planck equation, a charge conservation equation, the diffusion equation, the Butler-Volmer equation, and the Nernst equation described below.

The Nernst-Planck equation is an equation for solving ionophoresis and ion diffusion in an electrolyte or a porous electrode, and is expressed by a formula below. Various parameters expressed in Mathematical formulas 1 to 4 below may be configured such that a value in a bulk and a value in a porous body are appropriately converted as a function of porosity of a constituent material.

[Mathematical formula 1]

$$i_l = -\sigma_{l,eff}\nabla\phi_l + \frac{\sigma_{l,eff}RT}{F}\left(1+\frac{\partial\ln f}{\partial\ln C_l}\right)(1-t_+)\nabla\ln C_l$$

$$\nabla\cdot i_l = i_{tot}$$

Here, $i_l$ is liquid phase current density (A/m$^2$), $\sigma_{l,\ eff}$ is liquid phase conductivity (S/m), $\Phi_l$ is liquid phase potential (V), R is a gas constant (J/(K·mol)), T is a temperature (K), F is the Faraday constant (C/mol), f is an activity coefficient, $C_l$ is ion concentration of the electrolyte (mol/m$^3$), $t_+$ is a cation transport number, and $i_{tot}$ is reaction current density per volume (A/m$^3$).

The charge conservation equation is an equation representing electron conduction in an active material or a current collecting foil, and is expressed by the following formula:

[Mathematical formula 2]

$$i_s = -\sigma_s\nabla\phi_s$$

$$\nabla\cdot i_s = -i_{tot}$$

Here, $\Phi_s$ is solid phase potential (V), $\sigma_s$ is solid phase conductivity (S/m), $i_s$ is solid phase current density (A/m$^2$), and $i_{tot}$ is reaction current density per volume (A/m$^3$).

The diffusion equation is an equation representing diffusion of an active material in an active particle, and is expressed by the following formula:

[Mathematical formula 3]

$$\frac{\partial C_s}{\partial t} = \nabla\cdot(D_s\nabla C_s)$$

Here, $C_s$ represents active material concentration (mol/m$^3$) in the solid phase, t represents time (s), and $D_s$ represents a diffusion coefficient (m$^2$/s) in the solid phase.

The Butler-Volmer equation is an equation representing an activation overvoltage in a charge transfer reaction occurring at an interface between the solid phase and the liquid phase, and the Nernst equation is a definition equation of open circuit potential, each of which is expressed by the following formula:

[Mathematical formula 4]

$$i_{loc} = i_0\left[\exp\left(\frac{\alpha_a F\eta}{RT}\right) - \exp\left(-\frac{\alpha_c F\eta}{RT}\right)\right]$$

$$\eta = \phi_s - \phi_l - E_{eq}$$

$$E = E_0 + \frac{RT}{zF}\ln\left(\frac{a_{ox}}{a_{red}}\right)$$

Here, $i_{loc}$ is reaction current density (A/m$^2$), $i_0$ is exchange current density (A/m$^2$), $\alpha_a$ and $\alpha_c$ are transition coefficients, $\eta$ is an activation overvoltage (V), $E_{eq}$ is equilibrium potential (V), $E_0$ is standard equilibrium potential (V), $a_{ox}$ is oxidizing agent concentration (mol/m$^3$), and $a_{red}$ is reducing agent concentration (mol/m$^3$). The exchange current density $i_0$ may be defined as a function of, for example, ion concentration of the electrolyte solution or concentration of the active material. A numerical value based on an experimental result may be used instead of the theoretical formula described in Mathematical formula 4. For example, in open circuit potential of a lithium ion secondary battery, actual measurement data of the state of charge (SOC) and the open circuit potential (OCP or OCV) may be used instead of the Nernst equation.

A relational expression between active material concentration in the solid phase and an active material flux related to a charge transfer reaction on the surface of the active material particle is shown in Mathematical formula 5. $r_0$ represents a radius (m) of the active particle, and $J_s$ represents a flux (mol/m$^2$s) of the active material. In other words, $J_s$ is an amount of the active material per unit area and unit time that disappear and is generated by a charge transfer reaction.

$$D_s \frac{\partial c_s}{\partial r}\bigg|_{r=r_o} = J_s \qquad \text{[Mathematical formula 5]}$$

Mathematical formula 6 is an equation describing a relationship between the flux $J_s$ of the active material and the reaction current density $i_{loc}$.

$$i_{loc} = zFJ_s \qquad \text{[Mathematical formula 6]}$$

Mathematical formula 7 is an equation describing a relationship between the reaction current density $i_{loc}$ and the reaction current density $i_{tot}$ per volume.

$$i_{tot} = S_v i_{loc} \qquad \text{[Mathematical formula 7]}$$

In the present embodiment, the Newman model is shown as an example of a model representing an electrochemical phenomenon of the power storage device. Alternatively, a single-particle model in which an electrode is represented by a single active particle, or a polynomial model in which open circuit potential and internal resistance as represented by the NTGK model are represented as a function of a temperature and a state of charge (SOC) may be used, or an equivalent circuit model may be used. The single-particle model is described in detail in Non-Patent Document "Cycle Life Modeling of Lithium-Ion Batteries, Gang Ning and Branko N. Popov, Journal of The Electrochemical Society, 151 (10) A 1584-A 1591 (2004)".

Next, an exothermic reaction caused by material decomposition will be described. It is known that a substance constituting the power storage device starts a reaction such as material decomposition as a temperature is increased. For example, when a positive electrode or a negative electrode material of a lithium ion battery is typically at about 200° C. to 300° C., material decomposition starts, and gas is generated with heat generation. Since such a temperature-dependent reaction rate is represented, the reaction can be expressed by the following Arrhenius reaction formula:

$$r = \frac{dx_f}{dt} = k_0 \exp\left(-\frac{E_a}{RT}\right)(1-x_f)^p (x_f + C_0)^q (1-x_f) \qquad \text{[Mathematical formula 8]}$$

$$Q = pH_p r$$

Here, r is a reaction rate (l/s), $k_0$ is a reaction rate constant (l/s), $E_a$ is activation energy (J/mol), R is a gas constant (J/(K·mol)), T is a temperature (K), $x_f$ is a reaction rate, and p, q, and $C_0$ are constants. Q is heat generation density (W/m$^3$), ρ is density (kg/m$^3$), and $H_p$ is reaction heat (J/kg).

In the power storage device, in a case where an internal short-circuit occurs, current flows from the entire power storage device toward the short circuit portion. Joule heating is generated by the current accompanying this internal short-circuit. An exothermic reaction such as the material decomposition progresses according to the generation of Joule heating. In a case where a temperature is increased by this exothermic reaction, electric resistance changes, and the magnitude of current flowing into the short circuit portion also changes. As described above, the Joule heating and the material decomposition exothermic reaction are not independent physical phenomena, but progress in association with each other through physical phenomena such as heat transfer.

In view of the above, the server device 100 according to the present embodiment performs analysis by coupling the exothermic reaction accompanying the material decomposition and the Joule heating, and simulates a thermal phenomenon from the power storage device to the outside in consideration of, for example, a change in electric resistance due to temperature increase.

Hereinafter, operation of the server device 100 and the client device 200 will be described.

Figure 7:
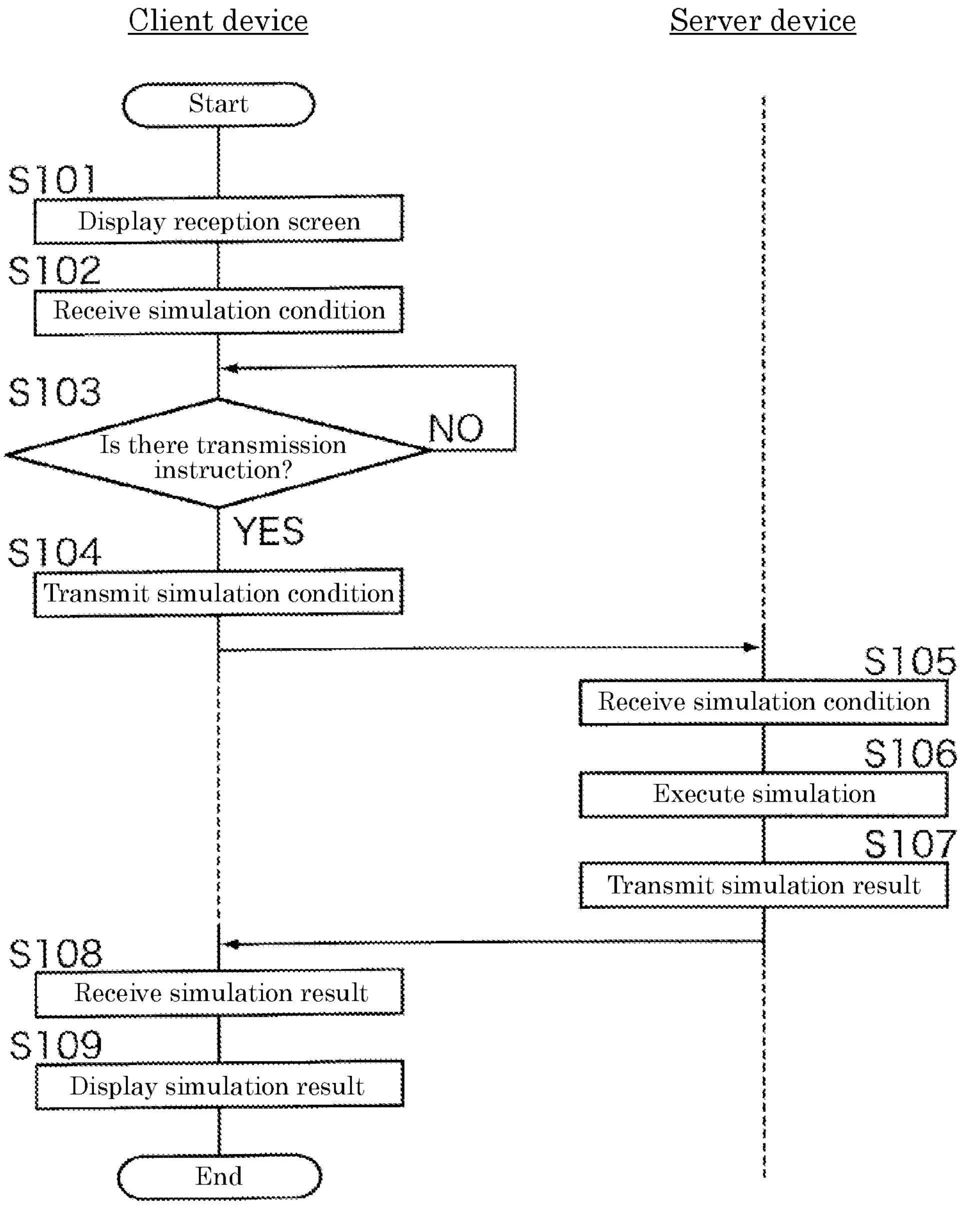
FIG. 7 is a flowchart describing a procedure of processing executed by the server device and the client device.

FIG. 7 is a flowchart describing a procedure of processing executed by the server device 100 and the client device 200. The control unit 201 of the client device 200 receives data for the display screen transmitted from the server device 100 after the user authentication, and displays the reception screen 210 for receiving a simulation condition on the display unit 205 (Step S101). The control unit 201 receives a simulation condition through the reception screen 210 displayed on the display unit 205 (Step S102). Specifically, the control unit 201 receives selection of a type of a battery, information on a resistance value of the short circuit portion in the internal short-circuit, and an occurrence location of the internal short-circuit.

Next, the control unit 201 determines whether a transmission instruction for a simulation condition is received (Step S103). In a case where the send button 214 is operated on the reception screen 210 illustrated in FIG. 5, the control unit 201 determines that the transmission instruction is received. In a case where the transmission instruction is received (S103: NO), the control unit 201 waits until the transmission instruction is received.

In a case where the transmission instruction is determined to be received (S103: YES), the control unit 201 transmits the simulation condition received in Step S102 from the communication unit 203 to the server device 100 (Step S104).

The server device 100 receives the simulation condition transmitted from the client device 200 through the communication unit 103 (Step S105). The control unit 101 of the server device 100 executes simulation on the basis of the condition received through the communication unit 103 (Step S106). At this time, the control unit 101 simulates a thermal phenomenon of the power storage device by executing a simulation program corresponding to behavior of the simulation target. The simulation condition input by the user is applied when the simulation program is executed.

In the power storage device, in a case where an internal short-circuit occurs, current flows from the entire power storage device toward the short circuit portion. Joule heating is generated by the current accompanying this internal short-circuit. An exothermic reaction such as material decomposition progresses according to the generation of Joule heating. The control unit 101 couples a Joule heating reaction and an exothermic reaction of material decomposition, calculates an electromotive force, internal resistance, and the like in the power storage device by, for example, the Newman model, and calculates a reaction rate in the exothermic reaction by the Arrhenius reaction formula shown in Mathematical formula 5. As described above, the control unit 101 can execute current calculation in consideration of a change in electric resistance due to temperature increase, and can simulate a thermal phenomenon in the power storage device while relating stop of energization due to temperature increase and a phenomenon in which a material generates heat by a decomposition reaction due to progress of the exothermic reaction. For example, it may be assumed that a portion where a material decomposition reaction progresses to a certain extent loses conductivity and energization stops.

When the simulation is completed, the control unit 101 transmits a simulation result to the client device 200 through the communication unit 103 (Step S107). The simulation result transmitted in Step S107 may be numerical data, or a graph, a contour diagram, a moving image, or the like generated from the numerical data. The simulation result transmitted in Step S107 may be a mathematical model obtained as a result of the simulation. The mathematical model is not merely a theoretical model, but represents a model after simulation is executed on the power storage device and various parameters are adjusted. The mathematical model is provided by, for example, a format of a library, a module, or the like used in commercially-available numerical analysis software or a programming language such as MATLAB (registered trademark), Amesim (registered trademark), Twin Builder (registered trademark), MATLAB & Simulink (registered trademark), Simplorer (registered trademark), ANSYS (registered trademark), Abaqus (registered trademark), Modelica (registered trademark), VHDL-AMS (registered trademark), C language, C++, or Java (registered trademark).

The client device 200 receives the simulation result transmitted from the server device 100 by the communication unit 203 (Step S108). The control unit 201 of the client device 200 causes the display unit 205 to display the received simulation result (Step S109).

As described above, in the present embodiment, the server device 100 can simulate a thermal phenomenon appearing in the outside from the power storage device in consideration of the exothermic reaction due to the material decomposition of the power storage device and Joule heating. Even if the user is not familiar with a physical phenomenon in the power storage device, the user can acquire a simulation result related to a thermal phenomenon of the power storage device without setting complicated simulation by inputting information related to a type of the power storage device, an occurrence location of internal short-circuit, and a resistance value of a short circuit portion from the client device 200.

In the present embodiment, the configuration in which a thermal phenomenon in a case where an internal short-circuit occurs in the power storage device is described. However, a thermal phenomenon in a case where an external short-circuit occurs can also be simulated. In this case, the server device 100 receives input of information related to the resistance value in the external short-circuit through the client device 200 (for example, a numerical value directly indicating a resistance value in an external short-circuit, or alternatively, information indirectly indicating a resistance value in an external short-circuit (specifically, a cause of the external short-circuit (external short-circuit between the positive electrode terminal and the negative electrode terminal by a tool such as a spanner, short-circuit outside the battery due to breakdown of insulation (coating) of wiring, short-circuit outside the battery due to crash, an external short-circuit due to a switch failure, and the like))), and simulates a thermal phenomenon based on the received information related to the resistance value of the external short-circuit. Specifically, the control unit 101 of the server device 100 calculates current flowing from the positive electrode terminal to the negative electrode terminal of the battery by the external short-circuit. Then, the control unit 101 can simulate the power storage device and a thermal phenomenon appearing in the outside from the power storage device by performing coupled analysis of Joule heating accompanying the current and an exothermic reaction of material decomposition according to generation of Joule heating.

Second Embodiment

In a second embodiment, a thermal phenomenon in a case where the power storage device is heated from the outside is simulated. There is a case where the power storage device is heated due to abnormality in a surrounding environment (when a mobile body equipped with the power storage device crashes, when a cooling device in a power storage device facility fails, and the like). There is a need to simulate in advance what kind of behavior the power storage device exhibits and what kind of thermal phenomenon appears to the outside in such a situation.

In a case where the power storage device has a rectangular parallelepiped shape (prismatic cell), behavior may vary depending on whether a side surface or an upper surface of the power storage device is heated. The same applies to a case where the power storage device is a pouch cell or a cylindrical cell. In a system (assembled battery) including a plurality of the power storage devices, behaviors of the power storage device positioned inward and the power storage device positioned outward may be different from each other due to a difference in distance from a heat source and an influence of heat accumulation. In view of the above, at the time of simulation, a heating location of the power storage device by a heat source is received.

The server device 100 receives, through the client device 200, simulation conditions including a heating location, an amount of heat, and an environmental temperature when the power storage device is heated from the outside. The heating location may be received via a user interface including graphical display similar to that of FIG. 5. The server device 100 simulates a thermal phenomenon based on the received simulation condition. Specifically, the control unit 101 of the server device 100 analyzes a material decomposition reaction that progresses according to heat applied from the outside using the Arrhenius reaction formula, so as to simulate a thermal phenomenon appearing in the outside from the power storage device.

Third Embodiment

In a third embodiment, description will be made on a configuration for executing simulation for an internal short-circuit of a wound cell (a cell in which a wound electrode assembly is housed in a case).

Figure 8:
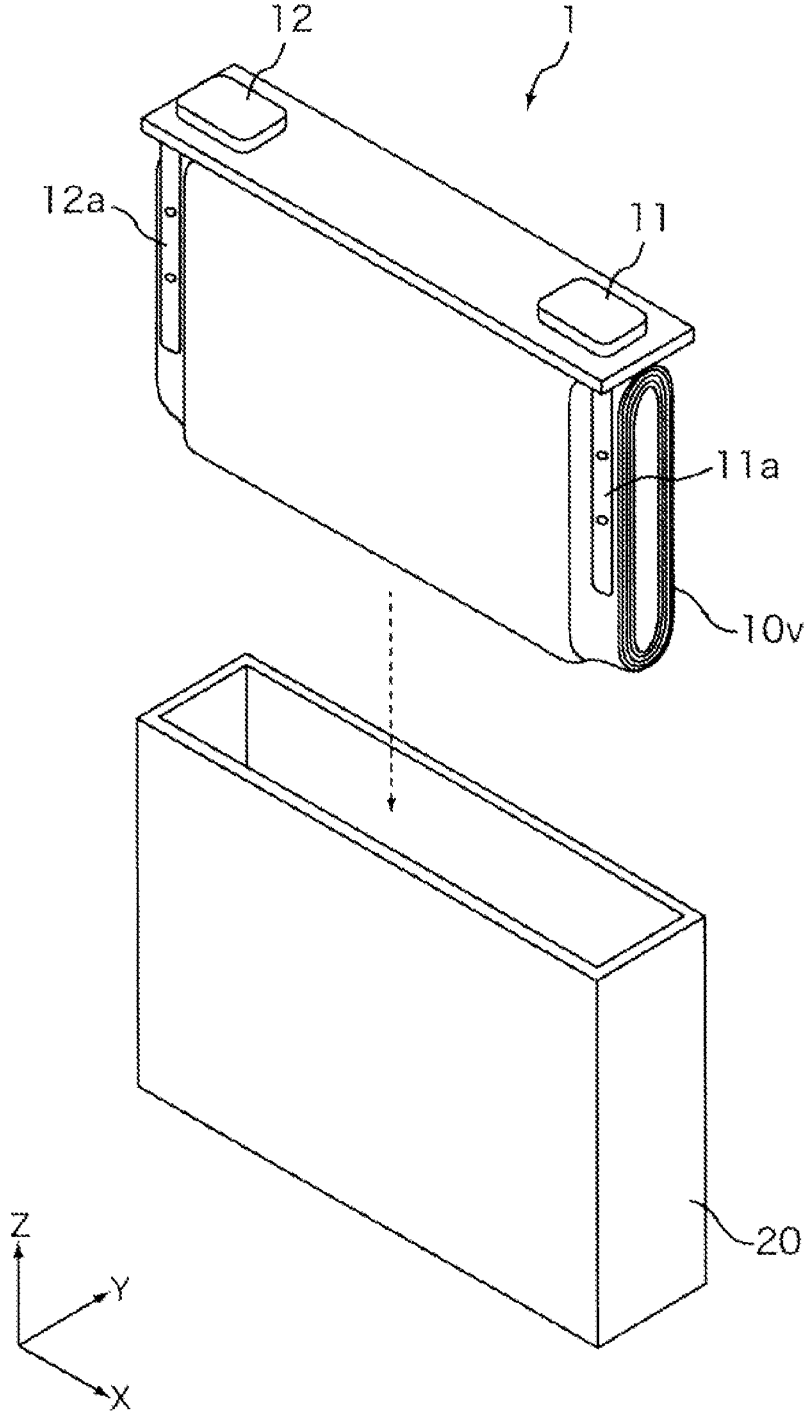
FIG. 8 is an explanatory view for describing a constituent element of a power storage device according to a third embodiment.

FIG. 8 is an explanatory view for describing a constituent element of a power storage device 1 according to the third embodiment. The power storage device 1 according to the third embodiment includes a wound electrode assembly **10*v*, a positive electrode terminal 11, a positive electrode current collector 11*a*, a negative electrode terminal 12, and a negative electrode current collector 12*a*, and for example, they are housed in a hollow rectangular parallelepiped case 20. In the electrode assembly 10*v*, for example, a separator made from a porous resin film is disposed between a strip-shaped negative electrode in which a negative active material is provided on negative electrode current collecting foil made from copper foil and a strip-shaped positive electrode in which a positive active material is provided on positive electrode current collecting foil made from aluminum foil disposed in a manner shifted in the width direction of the negative electrode, and these are wound to constitute the wound electrode assembly 10***v*.

The positive electrode current collector 11*a* electrically connects the positive electrode terminal 11 and a positive electrode (active material non-forming portion, positive electrode current collecting foil) of the electrode assembly 10*v*. The negative electrode current collector 12*a* electrically connects the negative electrode terminal 12 and a negative electrode (active material non-forming portion, negative electrode current collecting foil) of the electrode assembly 10*v*. The positive electrode current collector 11*a* is electrically connected to the positive electrode of the electrode assembly 10*v* at at least one point, and the negative electrode current collector 12*a* is electrically connected to the negative electrode of the electrode assembly 10*v* at at least one point. Positions of the positive electrode current collector 11*a* and the negative electrode current collector 12*a* may be in various forms within a range in which the electrical connection with the positive electrode and the negative electrode of the electrode assembly 10*v* does not change. In the example of FIG. 8, the direction of the winding center of the electrode assembly 10*v* is directed in the X axis direction in the drawing. Alternatively, the direction of the winding center of the electrode assembly 10*v* may be the Y axis direction or the Z axis direction in the drawing.

Figure 9:
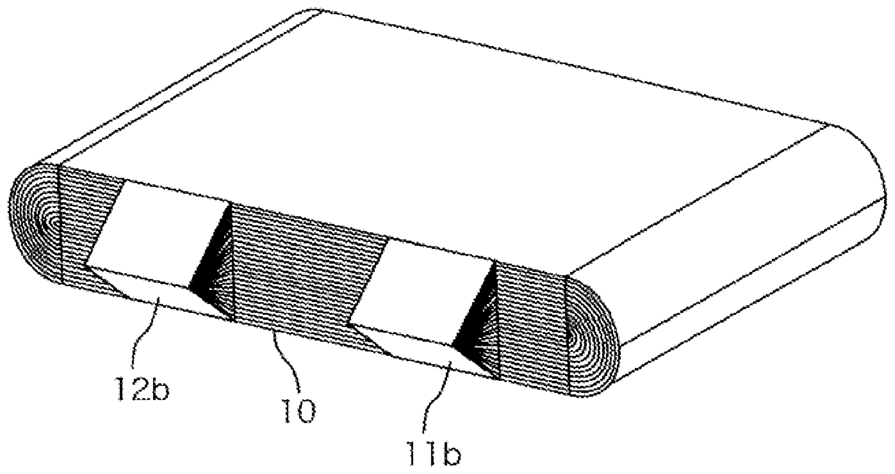
FIG. 9 is a diagram illustrating an electrode assembly of a type having an electrode tab in a wound cell.

FIG. 9 is a diagram illustrating an electrode assembly of a type having an electrode tab in a wound cell. In the negative electrode, a plurality of negative electrode tabs 12*b* (active material non-forming portions) are provided at intervals on one side extending in the longitudinal direction of the strip-shaped negative electrode current collecting foil. In the positive electrode, a plurality of positive electrode tabs 11*b* (active material non-forming portions) are provided at intervals on one side extending in the longitudinal direction of the strip-shaped positive electrode current collecting foil. A separator is disposed between the negative electrode and the positive electrode, and these are wound to constitute a wound electrode assembly. A plurality of the negative electrode tabs 12*b* and a plurality of the positive electrode tabs 11*b* are bundled and electrically connected to a negative electrode current collector and a positive electrode current collector (not illustrated), respectively.

Although not illustrated, in a laminated cell (a cell in which a laminated electrode assembly obtained by laminating a plurality of pieces of sheet-like current collecting foil is housed in a case), a short circuit occurs from an electrode other than a short-circuit layer through only a tab at the time of a short circuit. In contrast, in a wound cell, there are two types of current: current flowing from a short-circuit layer through the tab (the positive electrode tab 11*b* or the negative electrode tab 12*b*); and a current flowing from a curved portion between the wound cell and an adjacent electrode. For this reason, in the wound cell, a calculation method used in a laminated cell cannot be used.

In view of the above, in the present embodiment, short-circuit current is calculated in a state where the wound electrode assembly is virtually developed and expanded. Typical examples performed in the simulation of the internal short-circuit include a through short circuit represented by a nail penetration test and a partial short-circuit represented by a nickel piece mixing test. Hereinafter, each will be described in detail.

In the present embodiment, a case where the calculation of short-circuit current in both the through short circuit and the partial short circuit is performed in a shape in which the wound electrode assembly is developed will be described in detail.

Figure 10:
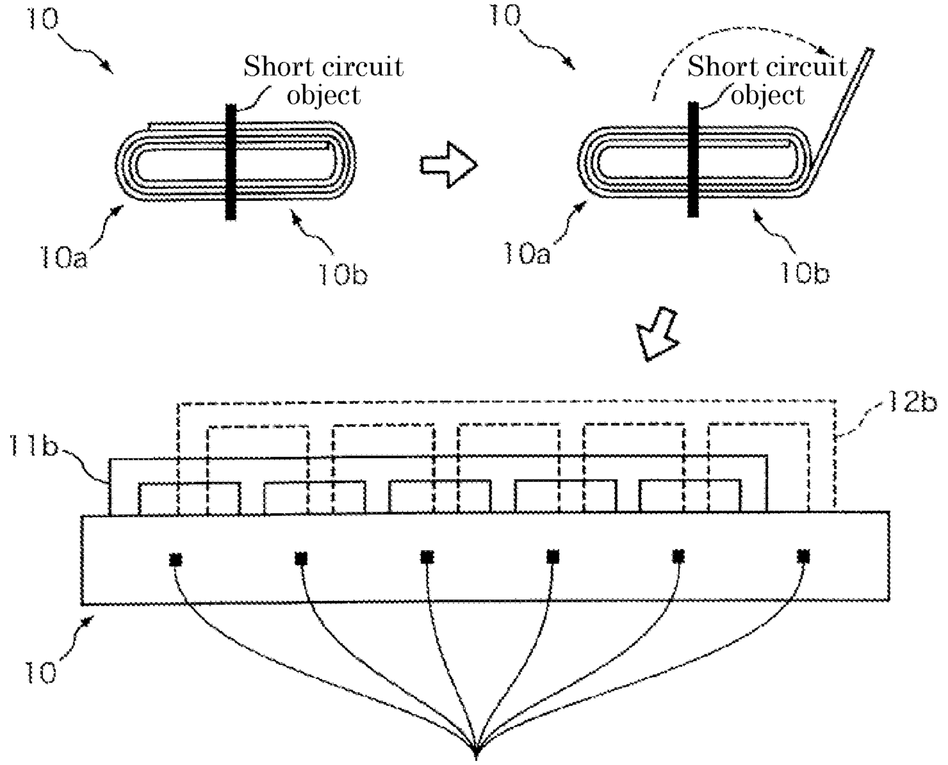
FIG. 10 is an explanatory view for describing an appearance location of a short circuit portion in a through short circuit in a wound electrode assembly.

FIG. 10 is an explanatory view for describing an appearance location of a short circuit portion in a through short circuit in the wound electrode assembly shown in FIG. 9. In FIG. 10, for the sake of description, shapes and sizes of the wound electrode assembly 10, the positive electrode tab 11*b*, and the negative electrode tab 12*b* (drawn by a broken line) are deformed. The example of FIG. 10 shows a state in which a conductor such as a nail penetrates the wound electrode assembly in a wound cell of three turns, that is, six layers in total. The developed model is a three-dimensional model in which positive electrode current collecting foil, a positive active material, a separator, a negative active material, and negative electrode current collecting foil are arranged from the near side to the far side of the drawing. The positive electrode tab 11*b* exists in the same plane (at the same position in the depth direction) as the positive electrode current collecting foil, and is electrically connected to the strip-shaped positive electrode current collecting foil of the developed electrode assembly 10 in six locations. Similarly, the negative electrode tab 12*b* exists in the same plane (at the same position in the depth direction) as the negative electrode current collecting foil, and is electrically connected to the strip-shaped negative electrode current collecting foil of the developed electrode assembly 10 in six locations. The positive electrode tab 11*b* and the negative electrode tab 12*b* are not directly electrically connected. A portion connecting a plurality of the positive electrode tabs 11*b* (a plurality of the negative electrode tabs 12*b*) in the lateral direction in the drawing is a virtual conductive path representing electrical connection of a plurality of tabs by tab binding as shown in FIG. 9. As shown in FIG. 10, in the case of the through short circuit, when the wound electrode assembly is developed, a plurality of short circuit portions appear in the longitudinal direction of the cell. In the present embodiment, by calculating current flowing from the tab (the positive electrode tab 11*b* or the negative electrode tab 12*b*) or the adjacent electrode toward each short circuit portion, a short-circuit phenomenon occurring inside the wound cell can be appropriately expressed, and a thermal phenomenon appearing in the outside from the wound cell can be accurately simulated. The wound electrode assembly has a portion where an electrode is bent, which is referred to as a curved portion 10*a* shown in FIG. 10. However, in this location, a physical property value (for example, electric conductivity, porosity, liquid phase conductivity, and the like) different from that of a flat portion 10*b* may be provided. An appropriate physical property value (for example, electron conductivity of $1.0\times10^{10}$ S/m or the like) may also be provided to a virtual conductive path representing electrical connection by tab binding in consideration of ease of convergence of calculation.

In the example of the through short circuit described in FIG. 10, the case where the short circuit occurs at the center of the wound electrode assembly is illustrated. However, according to this simulation method, the short circuit position is not limited to the center of the wound electrode assembly, and calculation can be performed by the same modeling method even when the short circuit position is in the vicinity of the tab or the vicinity of the curved portion 10*a*, for example.

Figure 11:
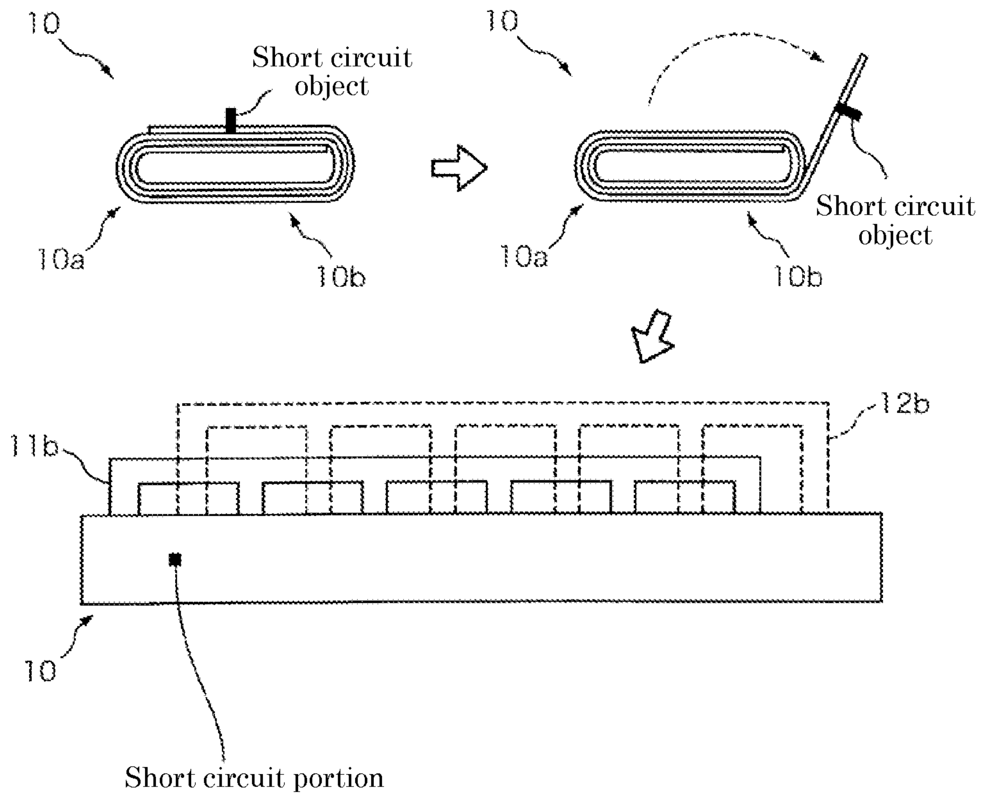
FIG. 11 is an explanatory view for describing an appearance location of a short circuit portion in a partial short circuit in the wound electrode assembly.

FIG. 11 is an explanatory view for describing an appearance location of a short circuit portion in a partial short circuit in the wound electrode assembly. In FIG. 11, for the sake of description, shapes and sizes of the wound electrode assembly 10, the positive electrode tab 11*b*, and the negative electrode tab 12*b* (drawn by a broken line) are deformed. The example of FIG. 11 shows a state in which a conductor such as a nickel piece short-circuits a part of the wound electrode assembly. The developed model is a three-dimensional model in which positive electrode current collecting foil, a positive active material, a separator, a negative active material, and negative electrode current collecting foil are arranged from the near side to the far side of the drawing. In this case, when the wound electrode assembly is developed, one short circuit portion appears in the longitudinal direction of the cell. In the present embodiment, by calculating current flowing from the tab (the positive electrode tab 11*b* or the negative electrode tab 12*b*) or the adjacent electrode toward each short circuit portion, a short-circuit phenomenon occurring inside the wound cell can be appropriately expressed, and a thermal phenomenon appearing in the outside from the wound cell can be accurately simulated. The wound electrode assembly has a portion where an electrode is bent, which is referred to as the curved portion 10*a* shown in FIG. 11. However, in this location, a physical property value (for example, electric conductivity, porosity, liquid phase conductivity, and the like) different from that of the flat portion 10*b* may be provided. An appropriate physical property value (for example, electron conductivity of $1.0\times10^{10}$ S/m or the like) may also be provided to a virtual conductive path representing electrical connection by tab binding in consideration of ease of convergence of calculation.

In the example of the partial short circuit described in FIG. 11, the case where the short circuit occurs in the outermost peripheral layer in the center of the wound electrode assembly is illustrated. However, according to this simulation method, the short circuit position is not limited to the center of the wound electrode assembly, and does not need to be the outermost peripheral layer. Furthermore, there may be a plurality of short circuit locations. For example, even in a case where two wound layers are short-circuited or a case where a nickel piece is mixed in a plurality of locations, the calculation can be performed by the same modeling method by performing simulation in a corresponding developed shape.

Although the above is the description regarding the calculation method of short-circuit current, heat transfer and an exothermic reaction may be performed in actual shapes. That is, it is not necessary to virtually develop on a plane as described above.

As described in the present embodiment, in the safety simulation of the wound cell, the simulation of short-circuit current in the shape in which the wound electrode assembly is developed and the simulation of the heat transfer and the exothermic reaction performed in the actual shape are performed in a coupled manner, so that calculation more accurately expressing the actual object can be performed.

Fourth Embodiment

In a fourth embodiment, a heat generation rate in the material decomposition reaction of the power storage device is calculated.

The server device 100 according to the fourth embodiment uses the above-described Arrhenius reaction formula of Mathematical formula 5 known as a Dahn model as a formula describing the exothermic reaction of the material decomposition reaction. The control unit 101 of the server device 100 calculates a reaction rate $x_f$ using the Arrhenius reaction formula of Mathematical formula 5.

When the reaction rate $x_f$ and heat generation density Q are calculated using the Arrhenius reaction formula of Mathematical formula 5, values of a reaction rate constant $k_0$, activation energy $E_a$, and constants p, q, and $C_0$ are required. In the method disclosed in JP-A-2006-10648, a graph of a relationship of temperature-calorific value obtained by the differential thermal analysis is converted into a relationship of time-calorific value, and then fitting is performed to acquire each of the parameters described above. In contrast, the present embodiment discloses a method of acquiring each parameter using the graph of the relationship of temperature-calorific value obtained by the differential thermal analysis without conversion.

First, the control unit 101 fits the data of temperature-calorific value obtained by the differential thermal analysis using a Lorentz function, a Gaussian function, or the like to acquire a relational expression of temperature-calorific value. The fitting by the Lorentz function or the Gaussian function is performed using an appropriate optimization tool.

Next, the control unit 101 converts heat generation density Q(T) obtained as a function of temperature into heat generation density Q(t) represented as a function of time by using an equation of differential chain rule shown in a formula below. In the following Mathematical formula 6, a factor represented by time partial differentiation of a temperature T is calculated in the course of calculation.

$$Q(t) = \frac{\partial Q(T)}{\partial T}\frac{\partial T}{\partial t} \qquad \text{[Mathematical formula 9]}$$

As described above, in the present embodiment, since the heat generation density Q(t) expressed as a function of time is calculated using the graph of the relationship of temperature-calorific value without conversion, work for converting the relationship of temperature-calorific value into the relationship of time-calorific value is omitted.

Fifth Embodiment

In a fifth embodiment, a method of simulating gas generation will be described.

In a case where an event such as an internal short-circuit occurs in the power storage device and a safety mechanism does not function well, there is possibility that the material decomposition reaction progresses and gas is ejected from the inside of the power storage device. For example, in a case of a liquid lithium ion battery, gas is generated by reaction of oxygen extracted from the positive active material by temperature increase with the electrolyte solution. Normally, a housing of the power storage device is provided with a safety mechanism such as a rupture valve that is operated by pressure, and when internal pressure is increased by gas generation inside the housing, the rupture valve is opened, and the gas is ejected to the outside.

Since this gas has a high temperature, this gas causes a spreading fire to an adjacent cell and burning of a structural member. Further, since harmful gas such as carbon monoxide may be contained in the gas ejected from the power storage device, predicting an ambient temperature in consideration of a temperature, a flow rate, and gas concentration is important in the safety design of the power storage device and an entire product including the power storage device.

In view of the above, the server device 100 according to the fifth embodiment simulates gas generation based on the exothermic reaction due to the material decomposition reaction. By calculating various amounts related to gas generation and using the calculated amounts as a boundary condition for thermal fluid simulation, for example, the calculated amounts can be used for thermal design and safety design of an electric vehicle, a power plant, and the like.

As a reaction involved in gas generation, for example, gas generation by oxygen extracted from a positive active material and an electrolyte solution and gas generation by thermal decomposition of an organic auxiliary agent contained in an electrode are known. These reactions are numbered 1, 2, . . . , i, . . . for convenience. Practically, it is difficult to analyze and consider in detail an elementary reaction process related to gas generation of a battery. In view of the above, a method of collating a differential thermal analysis (DSC) chart, a result of gas amount measurement, and the like to separate the reaction may be employed.

The control unit 101 calculates total normal gas volume $V_{tot}$ by $V_{tot}=\Sigma v_i x_{fi}$. Here, $v_i$ is normal volume of the gas generated in a case where the reaction i completely progresses, and $x_{fi}$ is a reaction rate of the reaction i.

The control unit 101 calculates pressure inside the power storage device housing. The gas in the housing is assumed to be ideal gas. The control unit 101 calculates internal pressure $P_{in}$ of the cell as $P_{in}=P_0\times(V_{tot}/V_{gap})\times(T/T_0)$. Here, $P_0$ is initial internal pressure (Pa) of the power storage device housing, and is usually 1 (atm). $V_{gap}$ is volume ($m^3$) of a gas existing region in the power storage device housing, T is a gas temperature (K), and $T_0$ is a reference temperature (K).

The rupture valve of the power storage device is configured to open when a condition of $P_{th}<P_{in}$ is satisfied. Here, $P_{th}$ is a threshold of internal pressure at which the rupture valve is opened. After the rupture valve is opened, gas generated by the reaction is discharged to the outside from the opened rupture valve.

The control unit 101 calculates a normal gas generation volume velocity $q_{norm,\ tot}$ by $q_{norm,\ tot}=\Sigma v_i r_i$. Here, $q_{norm,\ tot}$ represents a generation volume rate ($m^3$/s) of the normal gas, $v_i$ represents volume ($m^3$) of the normal gas generated by the i-th reaction, $r_i$ represents a reaction rate (1/s) of the i-th reaction, and $r_i=(d/dt)x_{fi}$, that is, a time derivative of the reaction rate in the reaction i is obtained.

When an area of an opening portion of the rupture valve is S($m^2$), an ejected gas velocity from the opening portion of the rupture valve is calculated by $v_{vent}=q_{norm,\ tot}/S\times(T/T_0)$ in consideration of thermal expansion. Here, $v_{vent}$ is an ejected gas velocity (m/s) of the gas ejected from the opening portion of the rupture valve. This value may be used as a velocity boundary condition for gas ejection from the opening portion of the rupture valve as it is, or a parabolic velocity distribution may be provided. In a case where a turbulence model such as a k-c model or a k-ω model is used as a fluid calculation model, a value in consideration of convergence may be provided to a term specific to the turbulence model such as turbulence energy or a turbulence disappearance rate.

The control unit 101 calculates a heat generation rate due to the exothermic reaction as well as a gas ejection velocity. The method for calculating the heat generation rate may be the same as the method described in the first embodiment.

An amount of heat generated by the exothermic reaction is appropriately distributed to the ejection gas and the power storage device. As an example of a distribution ratio at this time, a method of distributing the amount of heat by a ratio of each heat capacity by assuming that the gas and the power storage device instantaneously reach thermal equilibrium may be employed. Alternatively, a distribution ratio of the amounts of heat to the ejection gas and the power storage device may be provided so as to match an experimental result.

The disclosed embodiments are illustrative in all respects and not restrictive. The scope of the present invention is defined by the claims, and includes meanings equivalent to the claims and all changes within the scope.

Figure 12:
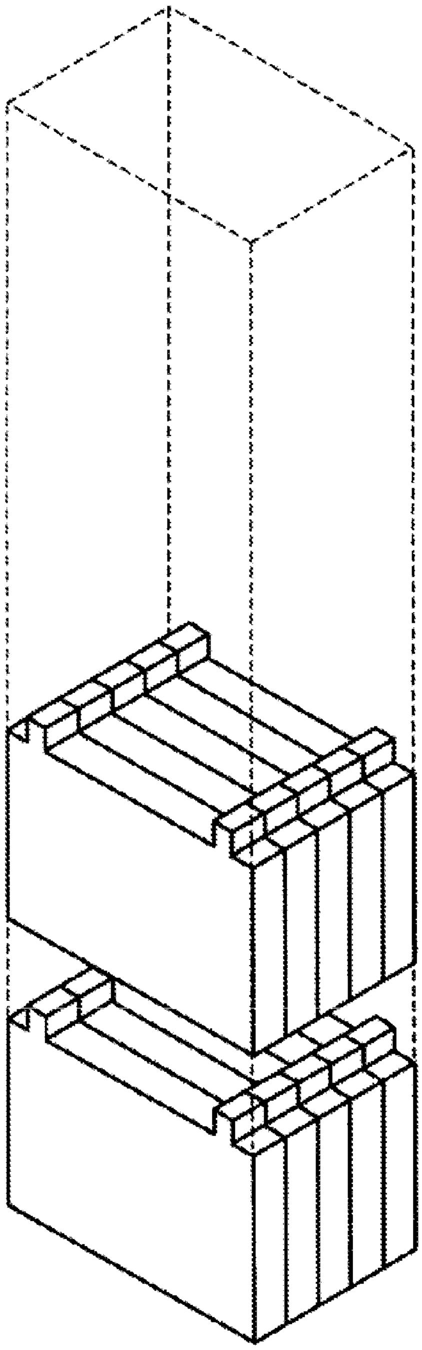
FIG. 12 is a schematic diagram illustrating a system (assembled battery) including a plurality of power storage devices.
Figure 13:
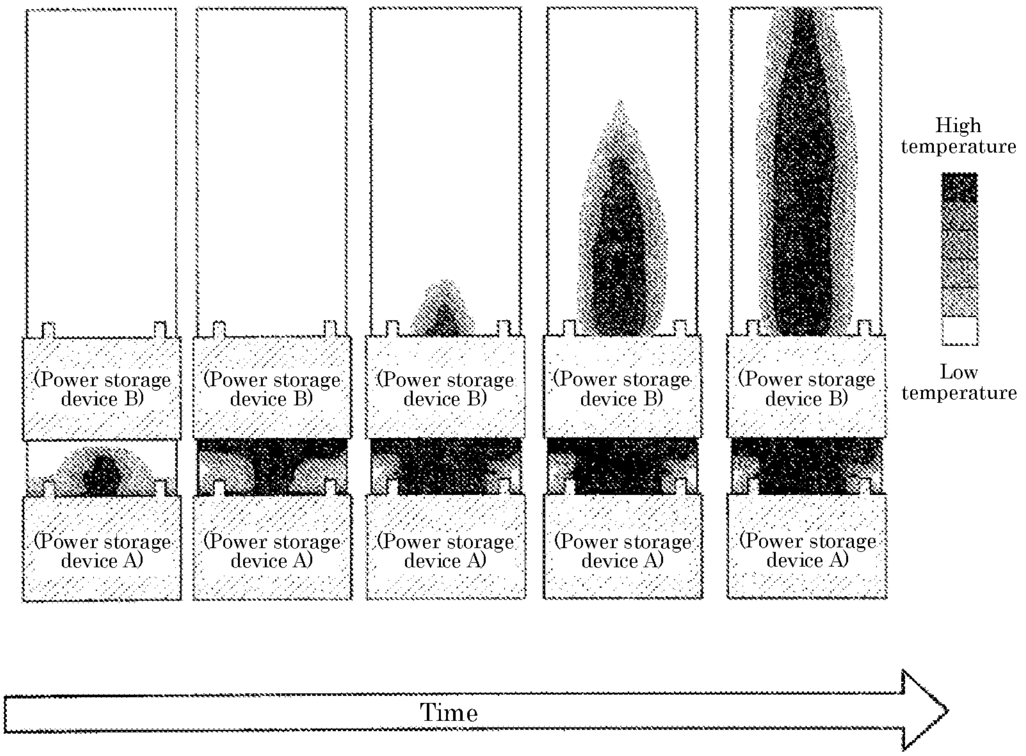
FIG. 13 is graphic display (moving image display) visualizing a state in which a plurality of power storage devices sequentially discharges gas in the system of FIG. 12.

For example, in the first to fifth embodiments, a single power storage device is described as an example. However, simulation can also be executed for a system (assembled battery or the like) including a plurality of power storage devices. FIG. 12 is a schematic view illustrating a system (assembled battery) including a plurality of power storage devices, and FIG. 13 is graphic display (moving image display) visualizing a state in which a plurality of power storage devices discharge gas in a chain manner in the system of FIG. 12. For example, it is also possible to simulate a chain event of gas ejection in which a temperature of a power storage device A increases due to a factor such as an internal short-circuit, gas discharged from the power storage device A increases a temperature of a power storage device B, and the power storage device B discharges gas in a chain manner (see FIG. 13).

In summary, the simulation method 1) receives a simulation condition related to a first power storage device, and calculates short-circuit current based on the received simulation condition to simulate a thermal phenomenon from the first power storage device to the outside, and
2) simulates a thermal phenomenon from a second power storage device to the outside accompanying heating of the second power storage device due to a thermal phenomenon from the first power storage device to the outside.

As another embodiment, there can be considered a simulation method that 1) receives a simulation condition related to a first power storage device, the simulation condition including a heating location when the first power storage device is heated from the outside, simulates a thermal phenomenon from the first power storage device to the outside accompanying heating of the first power storage device based on the received simulation condition, and
2) simulates a thermal phenomenon from a second power storage device to the outside accompanying heating of the second power storage device due to a thermal phenomenon from the first power storage device to the outside.

These simulation methods may be implemented as a simulation device or a computer program.

With these simulation methods, it is possible to visualize a state of a spreading fire in a system including a plurality of power storage devices. It is possible to grasp which power storage device exhibits what thermal phenomenon in time series, which power storage device and which power storage device exhibit a thermal phenomenon in conjunction with each other, and the like.

In the present specification, the simulation target is described focusing on a thermal influence of the power storage device on the outside. However, attention may be paid to the inside of the power storage device. For example, gas ejected from the power storage device has an effect of suppressing temperature increase of the power storage device. For this reason, it is also possible to calculate a state inside the power storage device with exactly the same idea.

Various utilization methods are conceivable for the safety simulation described in the present specification. For example, in a case where the power storage device is exposed to a desired thermal condition, the simulation method of the present application can be utilized to determine whether or not the rupture valve is opened by gas generation and increase in internal pressure due to material decomposition. The simulation method of the present application can also be utilized to examine whether or not a spreading fire to a peripheral power storage device occurs if the rupture valve is opened and gas is ejected. Furthermore, for example, an effect of a heat insulating material, a refractory material, and the like for preventing a spreading fire can be checked by calculation, which is a means for strongly promoting product design based on the idea of model-based development.

An embodiment in which simulation is performed by communication between a server and a client is exemplified in the first embodiment. However, the embodiment may be such that a server administrator provides a simulation program to the client user by means of a storage medium such as a DVD-ROM, and the simulation is performed locally in a client terminal. A providing means may be a download form via communication.

The invention claimed is:

1. An information processing device comprising:

a non-transitory computer-readable medium that stores a simulation program; and a processor configured to execute the simulation program and cause the information processing device to receive a request from a terminal device operated by a user, located apart from an information processing device, communicably connected to the information processing device;

after receiving the request, transmit information for an interface screen to the terminal device, the interface screen being configured to receive inputs for a simulation condition related to a power storage device;

receive the inputs entered by the user at the terminal device by way of an interface screen for the simulation program for the simulation condition related to the power storage device;

calculate a short-circuit current based on the received simulation condition using a simulation model set up in advance and stored as part of the simulation program to determine a simulation result for a thermal phenomenon of the power storage device, the simulation model using a plurality of physical phenomena comprising chemical reaction, heat transfer, current, electrochemistry, fluid dynamics, and further using a mechanism property value and a physical property value stored in the non-transitory computer-readable medium; and transmit the simulation result of the power storage device, estimated at the information processing device, to the terminal device located apart from the information processing device.

2. The information processing device according to claim 1, wherein the simulation condition includes an occurrence location of an internal short-circuit in the power storage device, the processor further configured to:

simulate the thermal phenomenon accompanying the internal short-circuit.

3. The information processing device according to claim 1, wherein the power storage device includes a wound electrode assembly, the processor further configured to:

calculate the short-circuit current in a state where the wound electrode assembly is virtually developed.

4. The information processing device according to claim 1, wherein the simulation condition includes information related to a resistance value in an external short-circuit of the power storage device, the processor further configured to:

simulate the thermal phenomenon accompanying the external short-circuit.

5. The information processing device according to claim 1, wherein the simulation condition includes a heating location, an amount of heat, and an environmental temperature when the power storage device is heated from outside, the processor further configured to:

simulate the thermal phenomenon accompanying heating of the power storage device.

6. The information processing device according to claim 1, wherein the processor is further configured to:

formulate a relationship between a temperature and a calorific value obtained by differential thermal analysis of the power storage device; and calculate a heat generation rate in a material decomposition reaction of the power storage device based on a relational expression between a temperature and a calorific value obtained by formulation.

7. An information processing device comprising:

a non-transitory computer-readable medium that stores a simulation program; and a processor configured to execute the simulation program and cause the information processing device to receive a request from a terminal device operated by a user, located apart from an information processing device, communicably connected to the information processing device;

after receiving the request, transmit information for an interface screen to the terminal device, the interface screen being configured to receive inputs for a simulation condition related to a power storage device;

received the inputs entered by the user at the terminal device by way of an interface screen for the simulation program for the simulation condition related to the power storage device, the simulation condition including a heating location when the power storage device is heated from outside;

simulate a thermal phenomenon from the power storage device accompanying heating of the power storage device based on the received simulation condition using a simulation model set up in advance and stored as part of the simulation program to determine a simulation result, the simulation model using a plurality of physical phenomena comprising chemical reaction, heat transfer, current, electrochemistry, fluid dynamics, and further using a mechanism property value and a physical property value stored in the non-transitory computer-readable medium; and transmit the simulation result, estimated at the information processing device, to the terminal device located apart from the information processing device.

8. The information processing device according to claim 7, wherein the processor is further configured to:

formulate a relationship between a temperature and a calorific value obtained by differential thermal analysis of the power storage device; and calculate a heat generation rate in a material decomposition reaction of the power storage device based on a relational expression between a temperature and a calorific value obtained by formulation.

9. An information processing device comprising:

a non-transitory computer-readable medium that stores a simulation program; and a processor configured to execute the simulation program and cause the information processing device to receive a request from a terminal device operated by a user, located apart from an information processing device, communicably connected to the information processing device;

after receiving the request, transmit information for an interface screen to the terminal device, the interface screen being configured to receive inputs for a simulation condition related to a power storage device;

receive the inputs entered by the user at the terminal device by way of an interface screen for the simulation program for the simulation condition related to the power storage device;

simulate generation of gas accompanying a material decomposition reaction of the power storage device based on the received simulation condition using a simulation model set up in advance and stored as part of the simulation program to determine a simulation result, the simulation model using a plurality of physical phenomena comprising chemical reaction, heat transfer, current, electrochemistry, fluid dynamics, and further using a mechanism property value and a physical property value stored in the non-transitory computer-readable medium; and transmit the simulation result, estimated at the information processing device, to the terminal device located apart from the information processing device.

10. The information processing device according to claim 9, wherein the processor is further configured to:

calculate at least one of a generation rate of the gas and a generation rate of an amount of heat based on a reaction rate of the material decomposition reaction.

11. The information processing device according to claim 10, wherein the generation rate of the gas is calculated so as to be proportional to the reaction rate of the material decomposition reaction.

12. An information processing device comprising:

a non-transitory computer-readable medium that stores a simulation program; and a processor configured to execute the simulation program and cause the information processing device to receive a request from a terminal device operated by a user, located apart from an information processing device, communicably connected to the information processing device;

after receiving the request, transmit information for an interface screen to the terminal device, the interface screen being configured to receive inputs for a simulation condition related to a first power storage device;

receive the inputs entered by the user at the terminal device by way of an interface screen for the simulation program for the simulation condition related to the first power storage device;

calculate a short-circuit current based on the received simulation condition using a simulation model set up in advance and stored as part of the simulation program to determine a first simulation result for a first thermal phenomenon of the first power storage device, the simulation model using a plurality of physical phenomena comprising chemical reaction, heat transfer, current, electrochemistry, fluid dynamics, and further using a mechanism property value and a physical property value stored in the non-transitory computer-readable medium;

simulate a second thermal phenomenon from a second power storage device accompanying heating of the second power storage device due to the first thermal phenomenon from the first power storage device to determine a second simulation result; and transmit the first and second simulation results, estimated at the information processing device, to the terminal device located apart from the information processing device.

13. An information processing device comprising:

a non-transitory computer-readable medium that stores a simulation program; and a processor configured to execute the simulation program and cause the information processing device to receive a request from a terminal device operated by a user, located apart from an information processing device, communicably connected to the information processing device;

after receiving the request, transmit information for an interface screen to the terminal device, the interface screen being configured to receive inputs for a simulation condition related to a power storage device;

receive the inputs entered by the user at the terminal device by way of an interface screen for the simulation program for the simulation condition related to a first power storage device, the simulation condition including a heating location when the first power storage device is heated from outside;

simulate a first thermal phenomenon of the first power storage device accompanying heating of the first power storage device based on the received simulation condition using a simulation model set up in advance and stored as part of the simulation program to determine a first simulation result, the simulation model using a plurality of physical phenomena comprising chemical reaction, heat transfer, current, electrochemistry, fluid dynamics, and further using a mechanism property value and a physical property value stored in the non-transitory computer-readable medium;

simulate a second thermal phenomenon from a second power storage device accompanying heating of the second power storage device due to the first thermal phenomenon of the first power storage device to determine a second simulation result; and transmit the first and second simulation results, estimated at the information processing device to the terminal device located apart from the information processing device.

* * * * *